(12) United States Patent
Gelfenbeyn et al.

(10) Patent No.: US 11,575,766 B2
(45) Date of Patent: Feb. 7, 2023

(54) PROACTIVE ENVIRONMENT-BASED CHAT INFORMATION SYSTEM

(71) Applicant: Google LLC, Mountain View, CA (US)

(72) Inventors: Ilya Gennadyevich Gelfenbeyn, Sunnyvale, CA (US); Artem Goncharuk, Mountain View, CA (US); Ilya Andreevich Platonov, Berdsk (RU); Pavel Aleksandrovich Sirotin, Sunnyvale, CA (US); Olga Aleksandrovna Gelfenbeyn, Yurga (RU)

(73) Assignee: Google LLC, Mountain View, CA (US)

( * ) Notice: Subject to any disclaimer, the term of this patent is extended or adjusted under 35 U.S.C. 154(b) by 52 days.

(21) Appl. No.: 16/983,195

(22) Filed: Aug. 3, 2020

(65) Prior Publication Data
US 2020/0366750 A1    Nov. 19, 2020

Related U.S. Application Data

(63) Continuation of application No. 16/457,439, filed on Jun. 28, 2019, now Pat. No. 10,778,793, which is a
(Continued)

(51) Int. Cl.
*G06F 15/16*    (2006.01)
*H04L 67/55*    (2022.01)
(Continued)

(52) U.S. Cl.
CPC .............. *H04L 67/55* (2022.05); *H04L 51/02* (2013.01); *G10L 15/22* (2013.01); *G10L 15/26* (2013.01); *G10L 15/30* (2013.01); *H04L 67/52* (2022.05)

(58) Field of Classification Search
None
See application file for complete search history.

(56) References Cited

U.S. PATENT DOCUMENTS

| 6,721,706 B1 | 4/2004 | Strubbe et al. |
| 6,728,679 B1 | 4/2004 | Strubbe et al. |

(Continued)

FOREIGN PATENT DOCUMENTS

| CN | 1735027 | 2/2006 |
| CN | 1941786 | 4/2007 |

(Continued)

OTHER PUBLICATIONS

European Patent Office; Communication Pursuant to Article 94(3) EPC issued in Application No. 14893863.2; 12 pages; dated Mar. 15, 2021.
(Continued)

*Primary Examiner* — Phuoc H Nguyen
(74) *Attorney, Agent, or Firm* — Gray Ice Higdon

(57) ABSTRACT

Disclosed is the technology for computer-based "Daily Brief" service, which includes methods and corresponding systems for proactively providing push notifications for users of chat information systems. The push notifications are dynamically generated and presented to the user based on identification of one or more triggering events, which may include predetermined time/date, current geographical location, activity of peers and friends in social media associated with the user, scheduled events, appointments, meetings, emails, instant messages, and many more. The described technology improves the interaction interface between the user and chat information system.

17 Claims, 10 Drawing Sheets

Related U.S. Application Data continuation of application No. 15/316,634, filed as application No. PCT/RU2014/000421 on Jun. 6, 2014, now Pat. No. 10,432,742.

(51) Int. Cl.
  *H04L 51/02* (2022.01)
  *G10L 15/22* (2006.01)
  *G10L 15/26* (2006.01)
  *H04L 67/52* (2022.01)
  *G10L 15/30* (2013.01)

(56) References Cited

U.S. PATENT DOCUMENTS

| | | | |
|---|---|---|---|
| 6,731,307 B1 | 5/2004 | Strubbe et al. | |
| 6,792,086 B1* | 9/2004 | Saylor | H04M 3/4938 379/88.04 |
| 6,795,808 B1 | 9/2004 | Strubbe et al. | |
| 8,015,137 B2 | 9/2011 | Allen et al. | |
| 8,068,604 B2 | 11/2011 | Leeds et al. | |
| 8,762,156 B2 | 6/2014 | Chen | |
| 9,014,658 B2* | 4/2015 | Johnson | H04W 4/02 455/404.1 |
| 9,098,467 B1* | 8/2015 | Blanksteen | G06F 3/167 |
| 9,754,016 B1* | 9/2017 | Bozarth | G10L 15/26 |
| 10,026,400 B2 | 7/2018 | Gelfenbeyn et al. | |
| 2002/0042846 A1* | 4/2002 | Bottan | H04L 67/26 709/249 |
| 2003/0004776 A1 | 1/2003 | Perrella et al. | |
| 2004/0243419 A1 | 12/2004 | Wang | |
| 2005/0192741 A1 | 9/2005 | Nichols et al. | |
| 2007/0043687 A1 | 2/2007 | Bodart et al. | |
| 2007/0294229 A1 | 12/2007 | Au | |
| 2009/0093259 A1 | 4/2009 | Edge et al. | |
| 2010/0064018 A1 | 3/2010 | Luo | |
| 2011/0231240 A1 | 9/2011 | Schoen et al. | |
| 2011/0238409 A1 | 9/2011 | Larcheveque et al. | |
| 2011/0268263 A1 | 11/2011 | Jones et al. | |
| 2011/0314404 A1 | 12/2011 | Kotler et al. | |
| 2012/0191716 A1 | 7/2012 | Omoigui | |
| 2012/0309363 A1 | 12/2012 | Gruber et al. | |
| 2013/0024211 A1* | 1/2013 | Monteforte | G06Q 30/00 705/3 |
| 2013/0077772 A1 | 3/2013 | Lichorowic et al. | |
| 2013/0110505 A1 | 5/2013 | Gruber et al. | |
| 2013/0110518 A1* | 5/2013 | Gruber | G06F 16/3329 704/275 |
| 2013/0179791 A1 | 7/2013 | Polski et al. | |
| 2013/0185074 A1 | 7/2013 | Gruber et al. | |
| 2013/0185081 A1 | 7/2013 | Cheyer et al. | |
| 2014/0052681 A1* | 2/2014 | Nitz | H04L 51/02 706/46 |
| 2014/0129651 A1 | 5/2014 | Gelfenbeyn et al. | |
| 2014/0136013 A1* | 5/2014 | Wolverton | B60K 35/00 701/1 |
| 2014/0136187 A1* | 5/2014 | Wolverton | G10L 15/22 704/9 |
| 2014/0317502 A1* | 10/2014 | Brown | G06F 9/453 715/706 |
| 2015/0186156 A1* | 7/2015 | Brown | G06Q 10/10 715/706 |
| 2016/0217784 A1* | 7/2016 | Gelfenbeyn | G06F 3/04842 |
| 2017/0178626 A1 | 6/2017 | Gruber et al. | |
| 2019/0279264 A1* | 9/2019 | Gelfenbeyn | G06Q 30/0601 |

FOREIGN PATENT DOCUMENTS

| | | |
|---|---|---|
| CN | 102111413 | 6/2011 |
| CN | 102137489 | 7/2011 |
| CN | 103118164 | 5/2013 |
| CN | 103257787 | 7/2016 |
| CN | 103226949 | 2/2017 |
| EP | 2522160 | 12/2013 |
| RU | 2352979 | 4/2009 |
| RU | 2358979 | 4/2009 |
| RU | 2370804 | 10/2009 |
| RU | 2472307 | 1/2013 |
| WO | WO2006071271 | 7/2006 |
| WO | WO2009046362 | 4/2009 |

OTHER PUBLICATIONS

China National Intellectual Property Administration, Notice of Allowance issued in Application No. 201480080962.0, 6 pages; dated May 26, 2020.

European Patent Office; Communication pursuant to Article 94(3) EPC issued in Application No. 14893863.2, dated Mar. 10, 2020.

China National Intellectual Property Administration, Office Action issued in Application No. 201480080962.0, dated Sep. 29, 2019.

The European Patent Office; Communication issued in Application No. 14893863.2 dated Jul. 5, 2019.

European Patent Office; Communication pursuant to Article 94(3) EPC issued in Application No. 14893863.2, dated Dec. 3, 2018; 11 pages.

European Patent Office; Extended European Search Report issued in Application No. 14893863.2 dated Feb. 26, 2018.

European Patent Office; Communication pursuant to Article 94(3) issued in Application No. 14893863.2, 3 pages, dated Jun. 10, 2022.

\* cited by examiner

PROACTIVE ENVIRONMENT-BASED CHAT INFORMATION SYSTEM

TECHNICAL FIELD

This disclosure relates generally to chat information systems and, more particularly, to the technology for intelligent and proactive generation of push notifications to users of chat information systems based on multiple criteria as described herein.

DESCRIPTION OF RELATED ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A chat information system (CIS) is a computer-based agent having a human-centric interface for accessing and managing information. Traditionally, a CIS may interact with users in natural language to simulate an intelligent conversation and provide personalized assistance to the users. For example, the users may ask the CIS questions such as "Where is the nearest hotel?" or "What is the weather like today?" and receive corresponding answers. The users may also provide voice commands to the CIS so as to perform certain functions including, for example, generating emails, making phone calls, searching information, acquiring data, re-addressing user requests, guiding users, providing notifications and reminders, and so forth. CIS and personal digital assistant (PDA) systems are widely used and are of great help for users of computers and are especially helpful for holders of portable electronic devices such as smart phones, cellular phones, tablet computers, gaming consoles, and so forth.

The term "chat information system," or CIS, may also be also known as "spoken dialog system," "dialog system," "conversational agent," "chatter robot," "chatterbot," "chatbot," "chat agent," "digital personal assistant/agent," "automated online assistant," and so forth. All these terms are within the scope of the present disclosure and referred to as "chat information system" or "CIS" for simplicity.

Essentially, the CIS users may ask a great number of various questions and request a wide range of information. The users typically request one and the same type of information on a daily basis, which may include, for example, weather reports, traffic reports, local or global news, information related to scheduled meetings or appointments, evening events in a target city, navigational information, and so forth. However, some users may find it difficult or annoying to generate a plurality of CIS requests over and over again and every day to get typically requested information. Moreover, the users, when required to gather information from multiple sources on a daily basis, may simply forget to request certain information items, which may lead to unwanted consequences including missed meetings or events, missed deadlines, ignorance of important information, and so forth. Therefore, there is still a need for development of CIS and, in particular, there is a need for improvement of human-CIS interaction interface.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure approaches provide for the technology of intelligent and proactive generation of push notifications for the users of CIS based on multiple criteria. This technology overcomes at least some drawbacks of the prior art systems and improves the user-CIS interaction interface and overall user experience of using CIS.

According to an aspect of the present disclosure, a method is provided for proactively delivering push notifications in a CIS. The method may comprise identifying, by a processor operatively coupled to a memory, at least one triggering event. The method may further include generating, by the processor, a plurality of push notifications for a user. The plurality of push notifications may be associated, at least in part, with the at least one triggering event. The method may further include providing, by the processor, the plurality of push notifications to the user using, at least in part, the CIS.

In certain embodiments, the plurality of push notifications may include schedule information associated with the user. In certain embodiments, the plurality of push notifications includes one or more personal communications associated with the user. The personal communications may be associated with one or more of the following: an email, a text message, an instant message, a blog post, a social networking site message, and a voice message. In certain embodiments, the plurality of push notifications may include one or more news items or one or more news feeds. In certain embodiments, the plurality of push notifications may include one or more social networking site information items. In certain embodiments, the plurality of push notifications may include one or more weather information items. In certain embodiments, the plurality of push notifications may include a current time or date. In certain embodiments, the plurality of push notifications may include one or more dialog recommendations to initiate interaction of the user with the CIS.

In certain embodiments, the method may further comprise determining, by the processor, a current geographical location associated with the user, and the identifying of the at least one triggering event may be based at least in part on determination that the user is present within one of a predetermined geographical location or predetermined geographical area.

In certain embodiments, the identifying of the at least one triggering event may include recognizing, by the processor, a presence of one or more peripheral electronic devices within a predetermined distance from the current geographical location associated with the user device. In certain embodiments, the method may further comprise receiving, by the processor, a speech-based user input; and recognizing, by the processor, at least a part of the speech-based user input to generate a recognized input. The identifying of the at least one triggering event may include recognizing, by the processor, one or more predetermined words in the recognized input.

In certain embodiments, the identifying of the at least one triggering event may include recognizing, by the processor, one or more events associated with at least one social networking or blogging site.

In certain embodiments, the method may further comprise determining, by the processor, a current time associated with the user, and the identifying of the at least one triggering event may be based at least in part on determination that the current time relates to the predetermined time value. In certain embodiments, the method may further comprise determining, by the processor, a current time associated with the user, and the identifying of the at least one triggering event may include recognizing, by the processor, one or more calendar events scheduled within a predetermined time period from the current time.

In certain embodiments, the identifying of the at least one triggering event may include recognizing, by the processor, a presence of the user device within one or more wireless networks. In certain embodiments, at least a part of the plurality of push notifications may be provided as one or more displayable messages. In certain embodiments, at least a part of the plurality of push notifications may be provided as one or more audio messages. In certain embodiments, at least a part of the plurality of push notifications may be provided as one or more actionable messages.

In certain embodiments, the method may further comprise receiving, by the processor, a user selection of the at least one actionable message, and generating, by the processor, a response to the user selection.

In yet further embodiments, at least a part of at least one of the plurality of push notifications may include one or more instructions for a user device to obtain, from a server information associated with the at least one triggering event. The instruction can be activated and cause the user device to obtain, from the server, information associated with the at least one triggering event when a user of the user device reviews or opens at least one of the plurality of push notifications. In some embodiments, the instruction may include metadata. The instruction can cause the user device to send a request to the server to obtain associated information, with the request including meta-data of the instruction.

In another aspect, a CIS is provided. The CIS may include a speech recognition module configured to receive a speech-based user input, recognize at least a part of the speech-based user input, and generate a recognized input. The CIS may further include a dialog manager configured to generate at least one response to the recognized input. The CIS may further include an event manager configured to identify at least one triggering event. The CIS may further include a push notification manager configured to generate a plurality of push notifications for a user. The plurality of push notifications may be associated, at least in part, with the at least one triggering event.

In certain embodiments, the CIS may further include an output renderer configured to provide the plurality of push notifications to a user via a user device. The output renderer may include a text-to-speech generator. In certain embodiments, the output renderer may be configured to provide at least one of the plurality of push notifications as one or more audio messages. In certain embodiments, the output renderer may be configured to provide at least one of the plurality of push notifications as one or more a text message or an image message. In certain embodiments, the speech recognition module may include a plurality of speech recognizers.

In certain embodiments, at least one of the speech recognition module, the dialog manager, the event manager, and the recommendation manager may be a distributed computing module. In certain embodiments, at least one of the speech recognition module, the dialog manager, the event manager, and the recommendation manager may be a cloud computing module.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
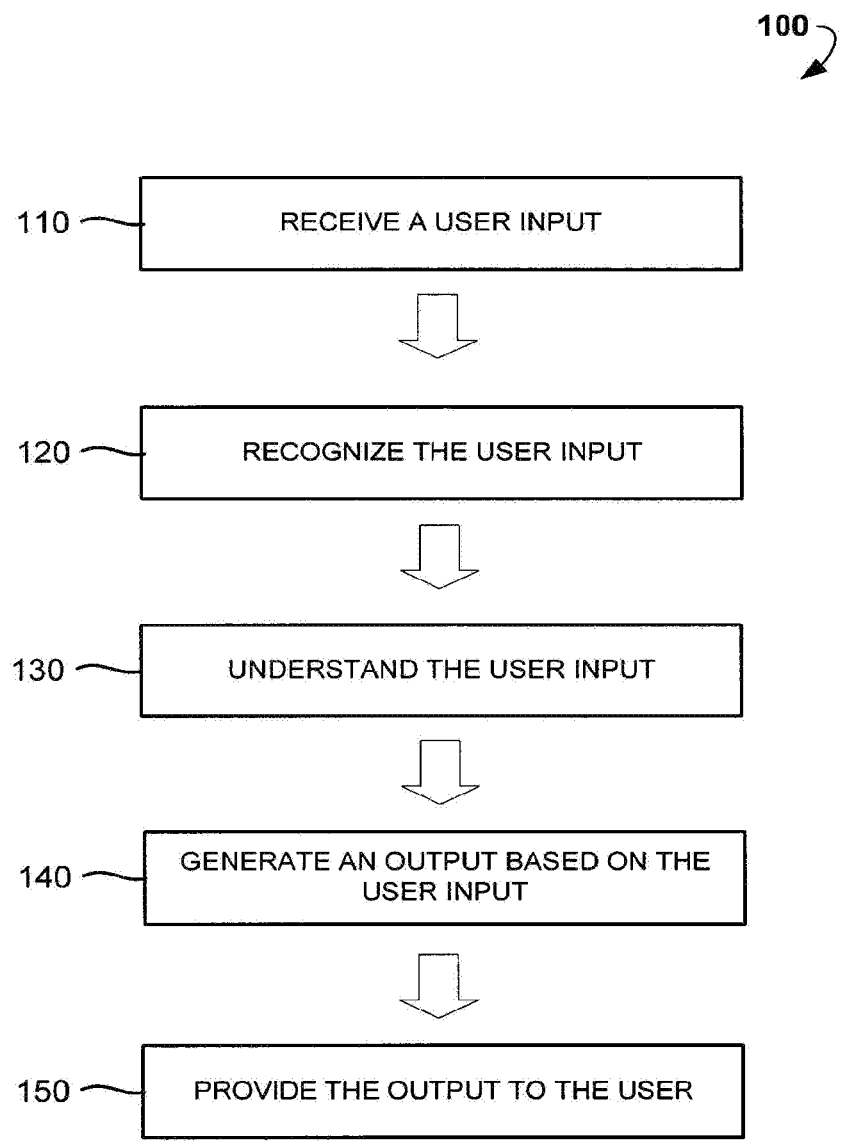
FIG. 1 is a high level flow diagram of user interaction with a CIS.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

Introduction

The embodiments of the present disclosure refer to a computer-based "Daily Brief" service, which implies methods and corresponding systems for proactively providing push notifications for users of CIS. In general, the push notifications may be dynamically and proactively generated and presented for attention of the users based on one or more criteria/rules, which are referred herein to as "triggering events." As described in greater detail below, the CIS may monitor a current time/date associated with the user or his user device, current geographical location of the user, activity of peers and friends in social media associated with the user, social networking events, scheduled events, calendar events, appointments, email accounts, instant message service, dialogue context of user-CIS interaction, presence of one or more specific devices within a predetermined area from the user, presence of certain wireless networks within a predetermined area from the user, and so forth. All these activities, events and information items may constitute or relate to triggering events. Based on the monitoring and identifying of one or more of these triggering events, the CIS may proactively generate one or more push notifications and present them to the user in the form of text messages, image messages, video messages, audio messages, and actionable messages through the user device once at least some triggering events are identified. In some embodiments, the push notifications may include all requested information such as a text, image, video, and audio content. In other embodiments, however, the push notifications may include metadata or instruction for the user device to obtain information associated with a triggering event from a corresponding networked server.

The user may interact with the CIS utilizing a user device selected from a wide range of electronic devices including, for example, a computer (desktop computer, laptop computer, tablet computer, PDA), smart phone, cellular phone, game console, game pad, remote controller, television device, smart (Internet) television device, audio system, in-vehicle computer system, infotainment system, or any other suitable electronic device. The interaction with the CIS may include speech commands, although key input commands, selection of actionable (clickable) messages, or gesture-based commands are also possible. As described below in greater detail, the CIS may refer to a software application installed on the user device, a server, or a remote device, or it may refer to a distributed application or a cloud-based service.

FIG. 1 shows a high level flow diagram 100 of user interaction with a CIS. As shown in this figure, the user may commence interaction at operation 110 with providing a speech-based (audio) user input via a user device (e.g., using one or more microphones). The user input may refer to an information request, such as "What is the weather like today?" or a speech command such as to send a text message or the like.

At operation 120, an automatic speech recognizer (ASR) of the CIS may recognize the user input so as to translate spoken words, phrases, and sentences into text, which are referred to herein as a recognized input. The recognized input is then analyzed at operation 130 by a natural language processing (NLP) module (e.g., morphological analysis, part-of-speech tagging, or shallow parsing are performed). The NLP module may also map the recognized input or its parts to one or more meaning representations (e.g., semantic frame) from which the dialog act, user goal, and named entities are extracted by a semantic parser or statistical model.

At operation 140, a dialog manager generates an output (response) based at least in part on the recognized input and located meaning representations. For example, the dialog manager may retrieve specific information from one or more resources (e.g., electronic calendar, database, website, etc.) or generate metadata or instruction for a user device to request corresponding information from a networked server. At operation 150, the output is provided to the user (for example, as a text, image, audio, or video message). For these ends, an output renderer may be utilized, which may transform text into speech and provide the output as a machine-generated audio signal. Alternatively, the output may be presented as a text message and shown on a display of the user device.

Figure 2:
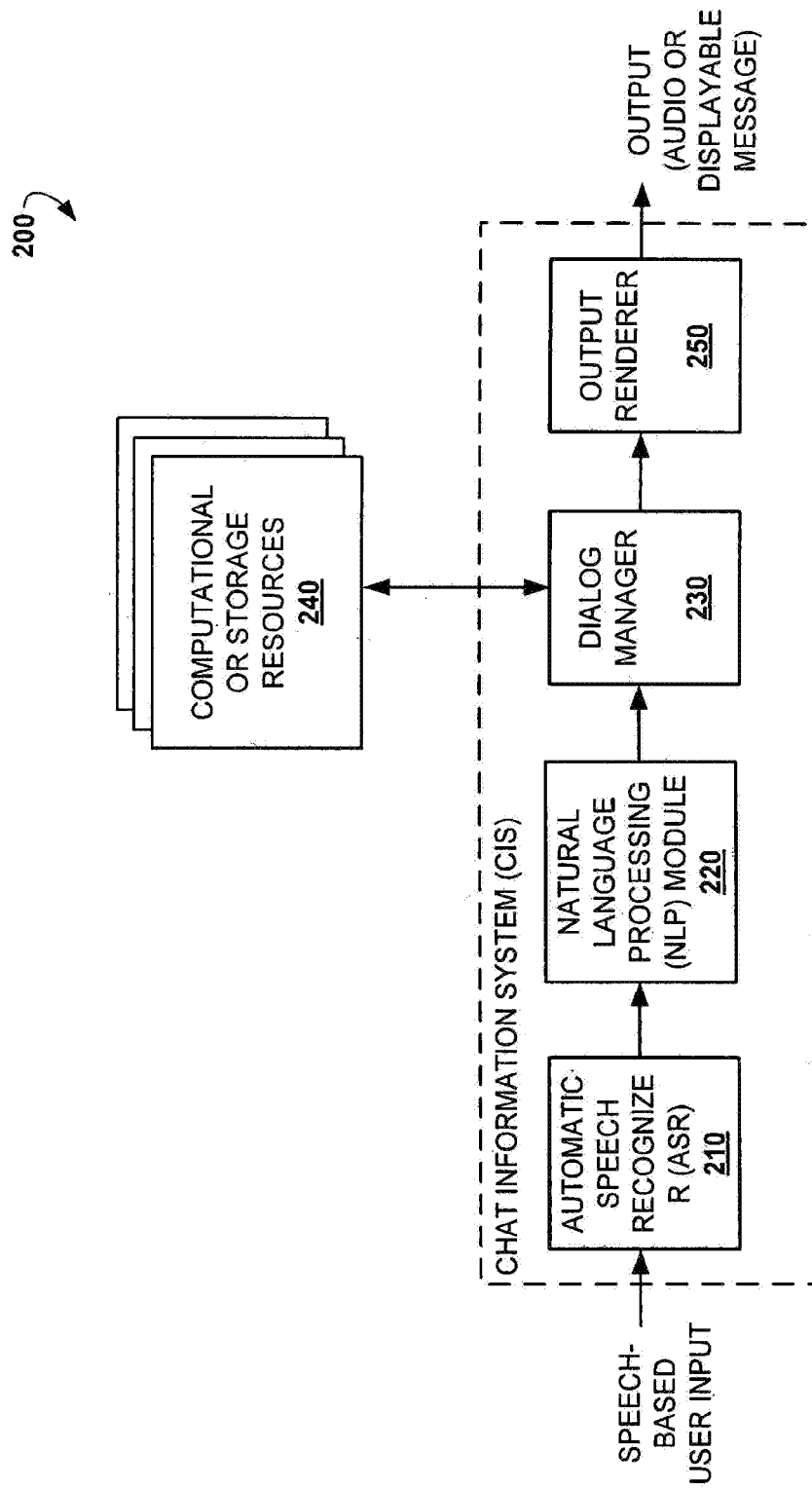
FIG. 2 is a high level architecture of a CIS according to an example embodiment.

The above given user interaction is further illustrated in FIG. 2, which shows a high level architecture of a CIS 200, according to an example embodiment. It should be noted that every module of the CIS 200 may include hardware components, software components, or a combination thereof. The CIS 200 may be embedded in the user device or server, or may be presented as a cloud computing module and/or a distributed computing module.

The CIS 200 may include an ASR 210 configured to receive and process speech-based user inputs into a sequence of parameter vectors. The ASR 210 further converts the sequence of parameter vectors into a recognized input (i.e., a textual input having one or more words, phrases, or sentences). The ASR 210 may include one or more speech recognizers such as a pattern-based speech recognizer, free-dictation recognizer, address book based recognizer, dynamically created recognizer, and so forth.

Further, the CIS 200 may include a NLP module 220 for understanding spoken language input. Specifically, the NLP module 220 may disassemble and parse the recognized input to produce utterances which are then analyzed utilizing, for example, morphological analysis, part-of-speech tagging, shallow parsing, and the like, and then map recognized input or its parts to meaning representations.

The CIS 200 may further include a dialog manager 230, which coordinates the activity of all components, controls dialog flows, and communicates with external applications/devices. The dialog manager 230 may play many roles, which include discourse analysis, knowledge database query, and system action prediction based on the discourse context. In some embodiments, the dialog manager 230 may contact one or more task managers (not shown) that may have knowledge of specific task domains. In some embodiments, the dialog manager 230 may communicate with various computing, logic, or storage resources 240, which may include, for example, a triggering criteria database, rules database, recommendation database, push notification database, electronic address book, email or text agents, dialog history database, various knowledge databases, map database, points of interest database, geographical location determiner, clock, wireless network detector, search engines, social networking websites, blogging websites, news feeds services, and so forth. The dialog manager 230 may employ multiple various approaches to generate output in response to the recognized input. Some approaches may include the use of statistical analysis, machine-learning algorithms (e.g., neural networks), heuristic analysis, and so forth. The dialog manager 230 is one of the central components of CIS 200. The major role of the dialog manager 230 is to select the correct system actions based on observed evidences and inferred dialog states from the results of NLP (e.g., dialog act, user goal, and discourse history). In addition, the dialog manager 230 should be able to handle errors when the user input has ASR and NLP errors caused by noises or unexpected inputs.

The CIS 200 may further include an output renderer 250 for transforming the output of the dialog manager 230 into a form suitable for providing to the user. For example, the output renderer 250 may employ a text-to-speech engine or may contact a prerecorded audio database to generate an audio message corresponding to the output of the dialog manager 230. In certain embodiments, the output renderer 250 may present the output of the dialog manager 230 as a text message, an image, or a video message for further displaying on a display screen of the user device.

System Architecture

Figure 3:
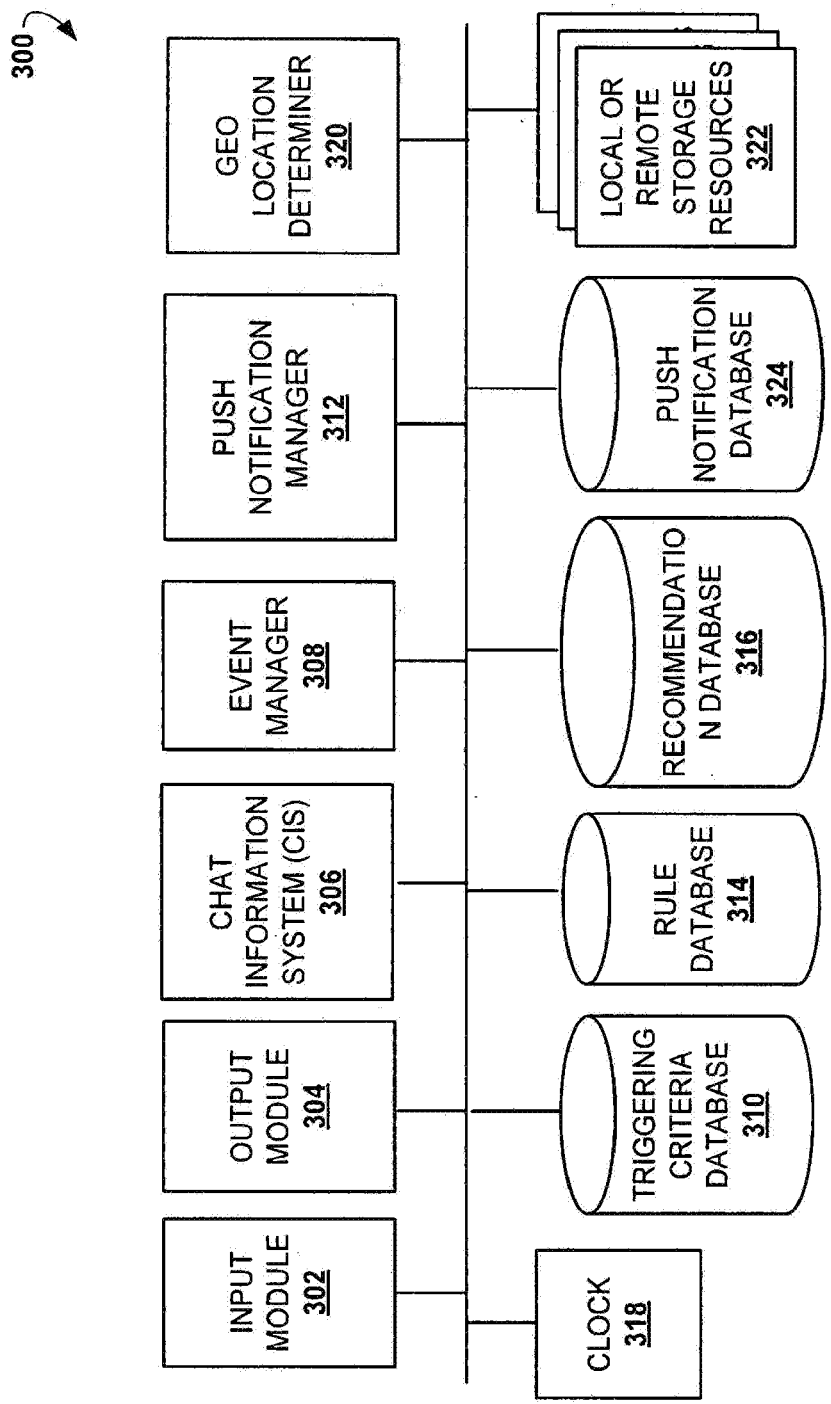
FIG. 3 is a high-level block diagram of an example system suitable for practicing the present technologies for proactively delivering push notifications.

FIG. 3 shows a high-level block diagram of an example system 300 suitable for practicing the present technologies for proactively delivering push notifications. It should be understood by those skilled in the art that all components of the system 300 may include logic elements, hardware components, software (firmware) components, virtual components, or a combination thereof. The modules of system 300 may be present in one device (e.g., a user device), multiple devices (e.g., in client-server environment), or may be distributed computing modules or cloud computing modules. Further, all modules shown in FIG. 3 may be operatively coupled using any suitable wired, wireless, radio, electrical, or optical standards.

As shown in FIG. 3, the system 300 may include one or more input modules 302 such as a microphone, touchscreen, keypad, keyboard, touchpad, trackball, video camera (e.g., for gesture recognition), motion sensors, and the like. The system 300 may also include one or more output modules 304 such as speakers or a display.

The system 300 further includes a CIS 306 for providing a human-centric interface for accessing and managing information as discussed herein. The CIS 306 may be represented by an example implementation shown above with reference to FIG. 2.

The system 300 further includes an event manager 308 for monitoring activities and identifying one or more triggering events. The triggering events may relate to a wide range of various activities or events. Some examples of triggering events may include:

- specific time/date (e.g., push notification may be generated daily at specified time or prior to one or more scheduled events);
- presence of the user or of the user device within a predetermined geographical location or area (e.g., push notification may be generated when the user travels to a new city);
- presence of the user or of the user device within a predetermined distance from a specific location or area (e.g., when the user is in proximity to specific office or restaurant);
- one or more predetermined words/phrases identified in user inputs (e.g., push notifications may be generated in response to certain user commands);
- type of user-CIS dialog context;
- events associated with social networking or blogging sites (e.g., a new friend's post, friend's event, new friend's status);
- news feeds or new information items;
- calendar or scheduled events/meeting;
- weather event;
- user's physical activity (e.g., running, playing sports, or long time inactivity);
- new, recent, or unread emails;
- new, recent, or unread instant messages (text messages, short message service messages);
- missed calls;
- new, recent, or unheard voice messages;
- traffic events;
- navigation activity or event;
- presence of the user device within one or more predetermined wireless networks;
- presence of the user or the user device in proximity of specific devices (e.g., detecting if the user is in a vehicle); and so forth.

The event manager 308 may refer to a triggering criteria database 310, which may store various criteria, rules, reference triggering events, and so forth. For example, the triggering criteria database 310 may store a list of triggering words (e.g., "weather," "email," "where," "schedule," "when," etc.), a list of predetermined geographical locations, a list of wireless networks, a list of peripheral devices, a list of user-CIS interaction types, dialog histories, and many other rules or criteria. The event manager 308 may refer to local or remote storage resources 322 (e.g., social media sites) for identifying triggering events or refer to any other modules of the system 300.

The system 300 may include a push notification manager 312 for generating push notifications for the user based at least in part on triggering events identified by the event manager 308, rules stored in rule database 314 and/or push notification templates stored in a push notification database 324. More specifically, once the event manager 308 identifies a specific triggering event, the push notification manager 312 refers to the rule database 314 and/or push notification database 324 to locate data and/or rules associated with the identified triggering event. Based on the located data/rule and the triggering event itself, the push notification manager 312 produces one or more push notifications for the user, which may be then presented to the user via the output module 304.

Notably, there are two types of push notifications. First, push notifications can contain all information to be presented to the user in the form of text, image, video, and/or audio content. Second, push notifications can contain a special instruction to a user device. The special instruction may include text or meta-data that the user device needs to submit to a particular networked server, web storage resources, or web services. The second option can be especially helpful for those CISs that have limitations for push notification messages. Accordingly, in the second option, when a user receives a push notification with such an instruction and opens it to review, the user device can generate a request to a server. The request may include metadata for the instruction and other data (e.g., a current location of the user). In response to the request, the server can create an answer and send the answer back to the user that includes the requested information (e.g., a current weather). When received by the user device, the user device can generate the push notification message "on the fly" and deliver the push notification to the user.

The push notification manager 312 may also generate recommendations for the user based on one of more triggering events. For this purpose, the push notification manager 312 may refer to the rule database 314 and/or recommendation database 316.

For example, when the user travels from Washington, D.C. to Sunnyvale, Calif., the event manager 308 may identify the new location of the user (user device) and consider it as a triggering event. Further, based on predetermined rules, the push notification manager 312 may generate push notifications to the user with a "Daily Brief" including, for example, weather information in Sunnyvale, traffic information, information regarding local restaurants, new emails, text messages and voice messages received while the user was offline (e.g., in a plane), and most recent information items from subscribed news feeds. The user may further interact with the CIS, for example, to get details of the new emails, messages, and navigation information to selected restaurants and so forth. Some other examples of user-CIS interaction will be given below.

Still referring to FIG. 3, the system 300 may include a clock 318 for providing current time or current time and date for the requesting module. The clock 318 may be either internal or remote module. The system 300 may further include a geo location determiner 320 for determining a current geographical location of the user device. The geo location determiner 320 may utilize a number of different methods for determining geographical location including, for example, receiving and processing signals of global positioning systems (GPS), GLONASS satellite navigation systems, or Galileo satellite navigation systems; utilizing multilateration of radio signals between radio towers (base stations); or utilizing geolocation methods associated with Internet Protocol (IP) addresses, Media Access Control (MAC) addresses, Radio-Frequency Identification (RFID), or other technologies.

The system 300 may include one or more local or remote storage or computing resources 322 including, for example, web resources, web sites, social networking websites, blogging websites, news feeds, email servers, web calendars, event databases, ticket aggregators, map databases, points of interest databases, and so forth. It should be clear that the event manager 308 and the recommendation manager 312 may also refer to these resources 322 for identifying triggering events or producing dialog recommendations.

Figure 4:
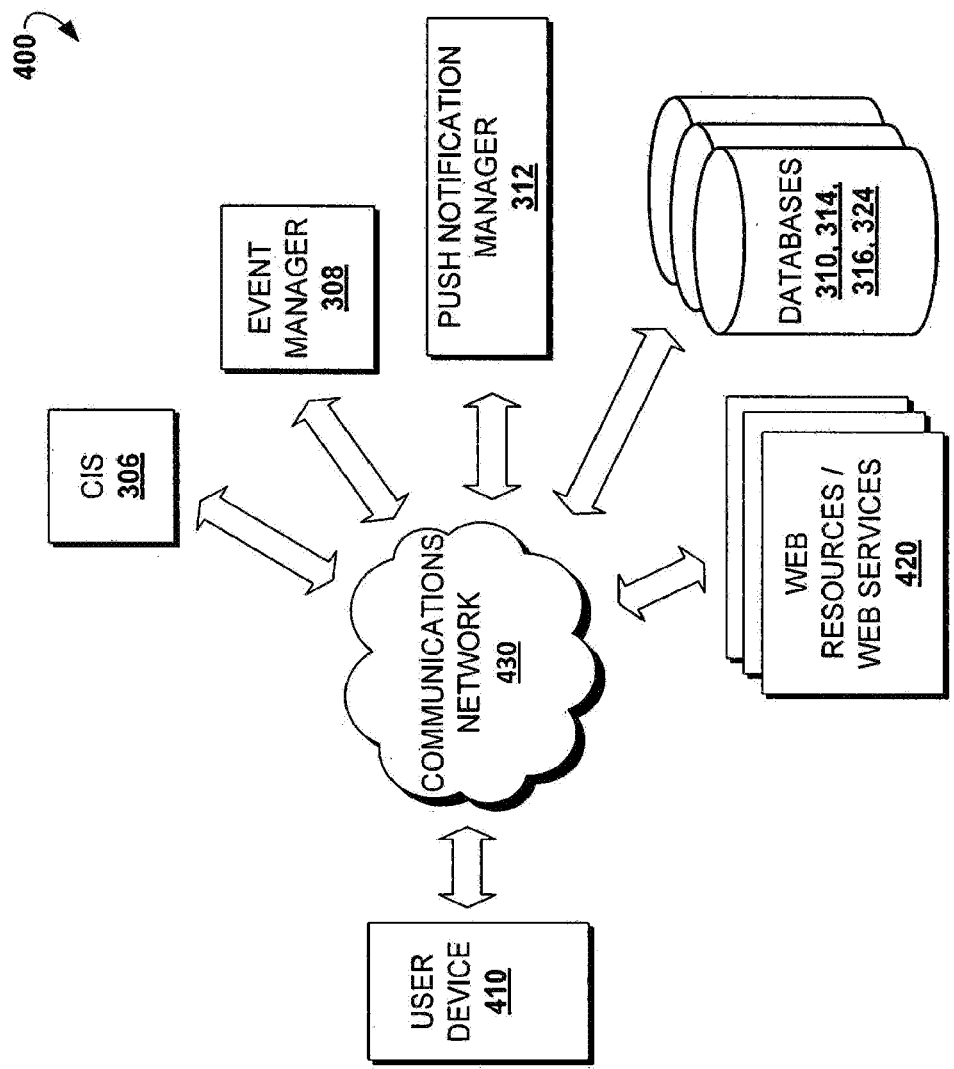
FIG. 4 is a high-level block diagram of an example system environment suitable for practicing the present technologies for proactive delivering push notifications.

FIG. 4 shows a high-level block diagram of an example system environment 400 suitable for practicing the present technologies for proactively delivering push notifications. The system environment 400 may include a user device 410, distributed modules including a CIS 306, an event manager 308, a push notification manager 312, one or more databases (e.g., a triggering criteria database 310, rules database 314, recommendation database 316, push notification database 324), one or more web resources and/or one or more web services 420, and a communications network 430.

According to various embodiments, the user device 410 may refer to a client in a "client-server environment." In general, the user device 410 may include a computer (e.g., a desktop computer, laptop computer, tablet computer), smart phone, wireless telephone, cellular phone, television system, remote controller, gaming console, gaming pad, in-vehicle computer, infotainment system, smart-home computer, and any other electronic device having at least one processing or computational unit. The user device 410 should be configured to receive or capture user audio inputs (e.g., via one or more microphones). Furthermore, the user device 410 may run dedicated software allowing it to practice the principles of the present disclosure. In an example, the user device 410 may run a browser allowing the user to visit a dedicated webpage or access a specific web service which employs at least some functionality of the CIS 306 and other modules. In another example, the user device 410 may run a dedicated mobile application enabling communication with the CIS 306 and other modules. It should be understood that the CIS 306, event manager 308, push notification manager 312 and/or other modules or databases 310, 314, 316, 324 may be run on the user device 410 or a networked server, or they may constitute distributed software application(s) running on both the user device 410 and a network server (not shown) or on a plurality of networked servers (e.g., be cloud-based embodiment).

The communications network 430 can be a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

In various embodiments, the one or more web resources and/or one or more web services 420 may include one or more of the following: webpages, websites, Internet search engines, databases, data storage resources, data aggregators (e.g., ticket aggregators), file sharing websites, email servers, email services, instant messaging services, social networking websites, blogging websites, micro-blogging websites, news services, news Rich Site Summaries (RSS), map services, online banking services, online calendar services, online appointment scheduling services, location determining services, weather services, time services, application programming interfaces (APIs), and so forth. The CIS 306, event manager 308, push notification manager 312, and the user device 410 may be configured to operatively communicate with these or similar web resources/web services 420 to exchange data depending on an application. For example, the CIS 306 may communicate with the at least one web resource/service 420 so as to generate responses to user inputs (e.g., to retrieve/download weather information). In another example, the event manager 308 may communicate with the at least one web resource/service 420 so as to identify triggering events (e.g., identifying a new status of the user's peers via at least one social networking site). In yet another embodiment, the push notification manager 312 may communicate with the at least one web resource/web service 420 so as to generate one or more dialog recommendations for the user (e.g., communicating with a map service to identify points of interests located near a current location of the user).

Figure 5:
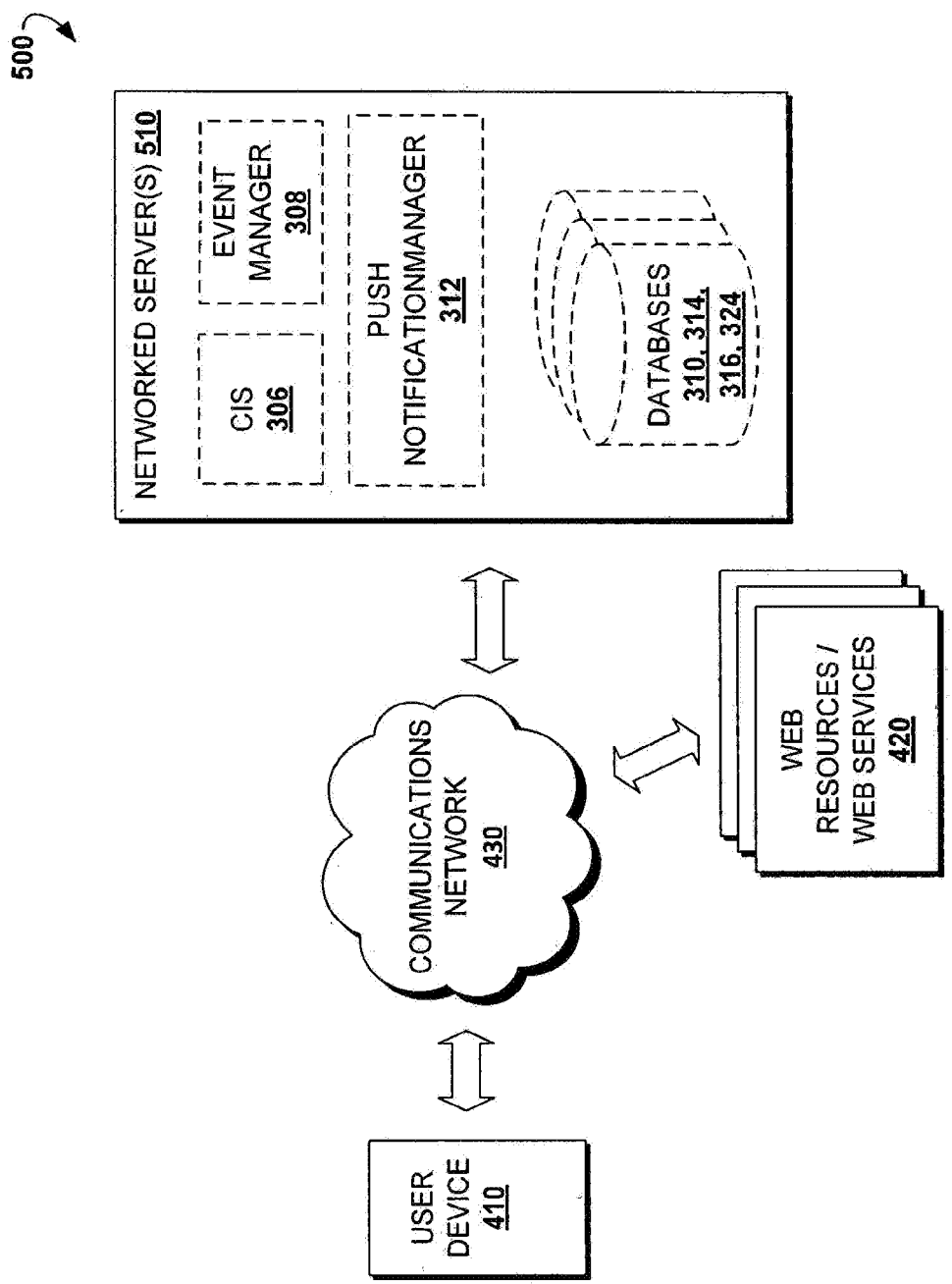
FIG. 5 is a high-level block diagram of another example system environment suitable for practicing the present technologies for proactive delivering push notifications.

FIG. 5 shows a high-level block diagram of another example system environment 500 suitable for practicing the present technologies for dynamic generation of dialog recommendations. In particular, in this embodiment, the CIS 306, event manager 308, push notification manager 312 and/or a plurality of databases 310, 314, 316, 324 may reside in one or more networked servers 510. It should also be clear that these modules may run in a plurality of networked servers or within a computing cloud.

Figure 6:
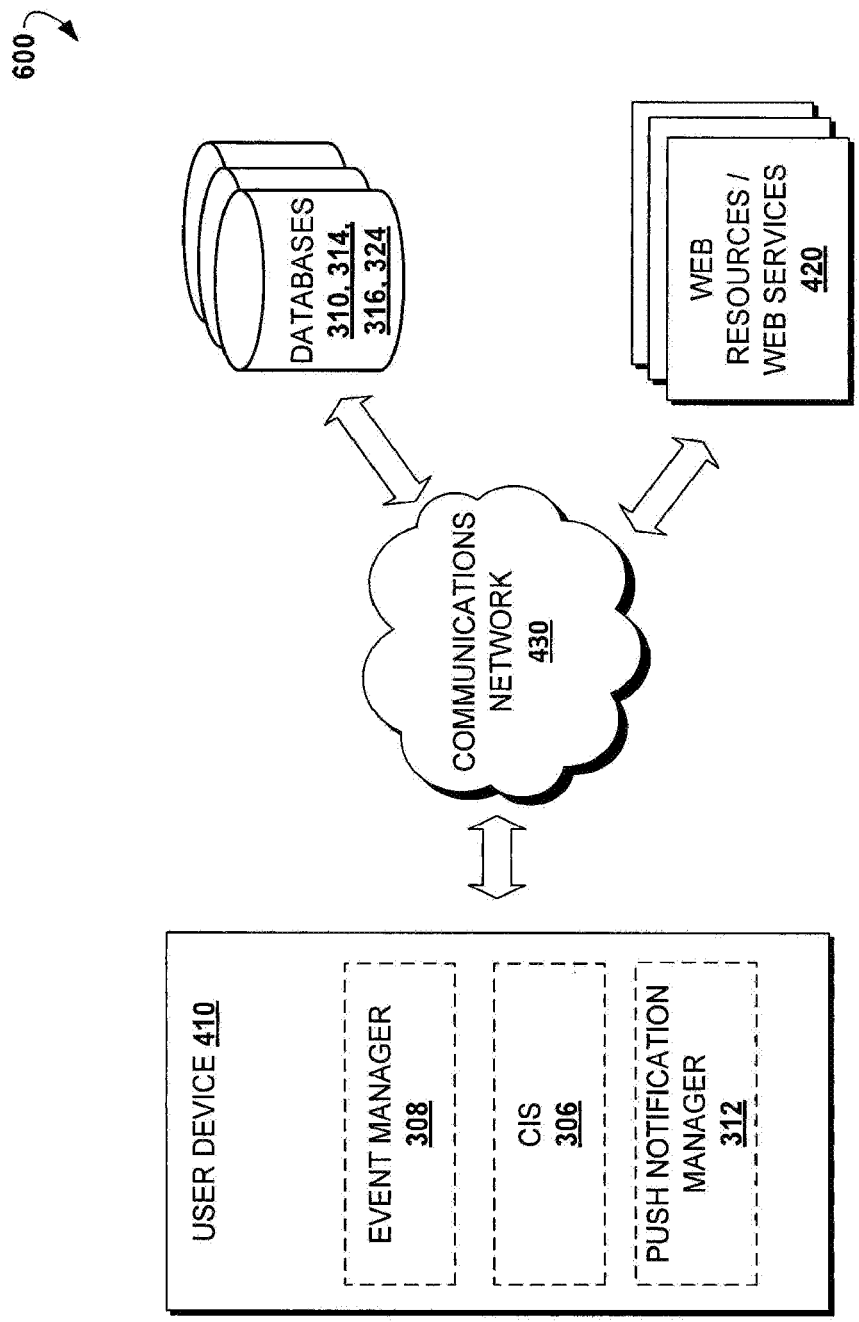
FIG. 6 is a high-level block diagram of yet another example system environment suitable for practicing the present technologies for proactive delivering push notifications.

FIG. 6 shows a high-level block diagram of yet another example system environment 600 suitable for practicing the present technologies. In particular, in this embodiment, the CIS 306, event manager 308, push notification manager 312 and, optionally, a plurality of databases 310, 314, 316, 324 may reside in the user device 410.

Graphical User Interface

Figure 7:
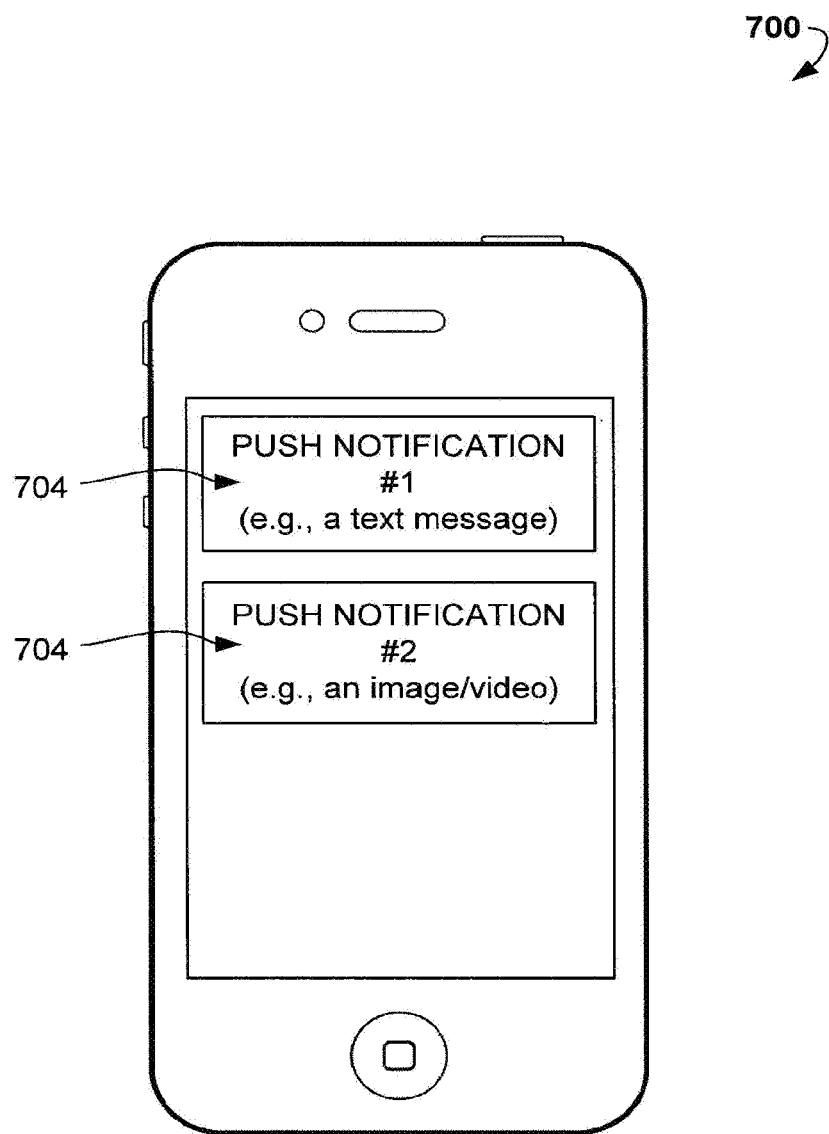
FIG. 7 illustrates a schematic diagram of a graphical user interface for a user device in accordance with an example embodiment.

FIG. 7 illustrates a schematic diagram of a graphical user interface 700 for a user device 410, in accordance with an example embodiment. Although the user device 410 is a smartphone in the example shown, the same or similar graphical user interface 700 may be provided for a desktop or laptop computer, tablet computer, or any other suitable device. In the example shown, the user device 410 includes a touchscreen which displays the user interface 700. In the example embodiment, the user interface 700 includes a tray (output box) 702 where one or more push notification messages 704 may be dynamically displayed. Push notification messages 704 may be presented as text messages, still or animated image messages, or a combination thereof. In certain embodiments, the push notification messages 704 may include some kind of information (e.g., news feeds, weather information, emails, etc.) or just a summary of the information to be provided.

Optionally, the push notifications 704 may be presented as actionable messages (buttons) or hyperlinks. The user may have an option to click or select one of the displayed push notifications, which would be equivalent to spoken commands. It should be also understood that the user may speak commands corresponding to the shown push notifications and that the CIS will provide a corresponding response. It should be also noted that the push notification messages 704 may also include dialog recommendation messages (or dialog recommendation data).

Figure 8:
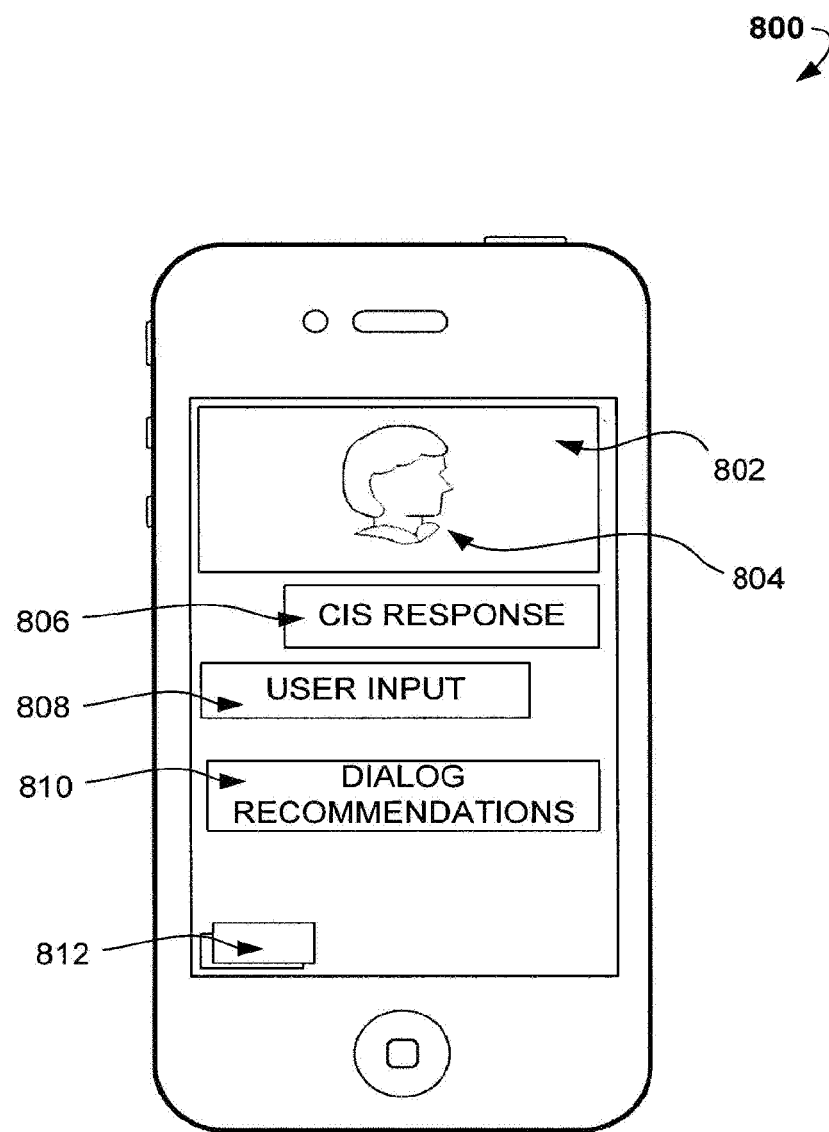
FIG. 8 is a schematic diagram of a graphical user interface with chat features for a user device in accordance with an example embodiment.

FIG. 8 illustrates a schematic diagram of a graphical user interface 800 with chat features for a user device 410, in accordance with an example embodiment. Although the user device 410 is a smartphone in the example shown, the same or similar graphical user interface 800 may be provided for a desktop or laptop computer, tablet computer, or any other suitable device. In the example shown, the user device 410 includes a touchscreen which displays the user interface 800. In the example embodiment, the user interface 800 includes a tray (output box) 802 where an avatar 804 is displayed. Optionally, the user can select a different avatar, or construct it from various elements (e.g., select clothes, eyes, hair, etc.). Optionally, multiple trays for multiple topics can be employed. The user interface 800 also includes a tray 806 for displaying a message (text, image, or video) generated by the system (i.e., a CIS response). The user interface 800 may also include a tray 808 for displaying user input (e.g., a recognized audio input or manual text input). The user interface 800 also includes a tray 810 for displaying one or more dialog recommendations generated by the push notification manager 312. The dialog recommendations may be presented as a text, image, video, or a combination thereof. Furthermore, the dialog recommendations may be displayed in separate actionable messages (buttons) or hyperlinks. The user may have an option to click or select one of the displayed dialog recommendations, which would be equivalent to spoken dialog recommendations.

According to certain embodiments, the user may interact with the user interface 800 by making a contact or by touching the trays. The user interface 800 may also include one or more control buttons 812. The control buttons 812 may be used for selecting or changing specific settings, displaying characteristics, or controlling other options. The contact can be a gesture, such as, for example, one or more taps or one or more swipes (from left to right, from right to left, upward and/or downward).

Method of Operation

Figure 9:
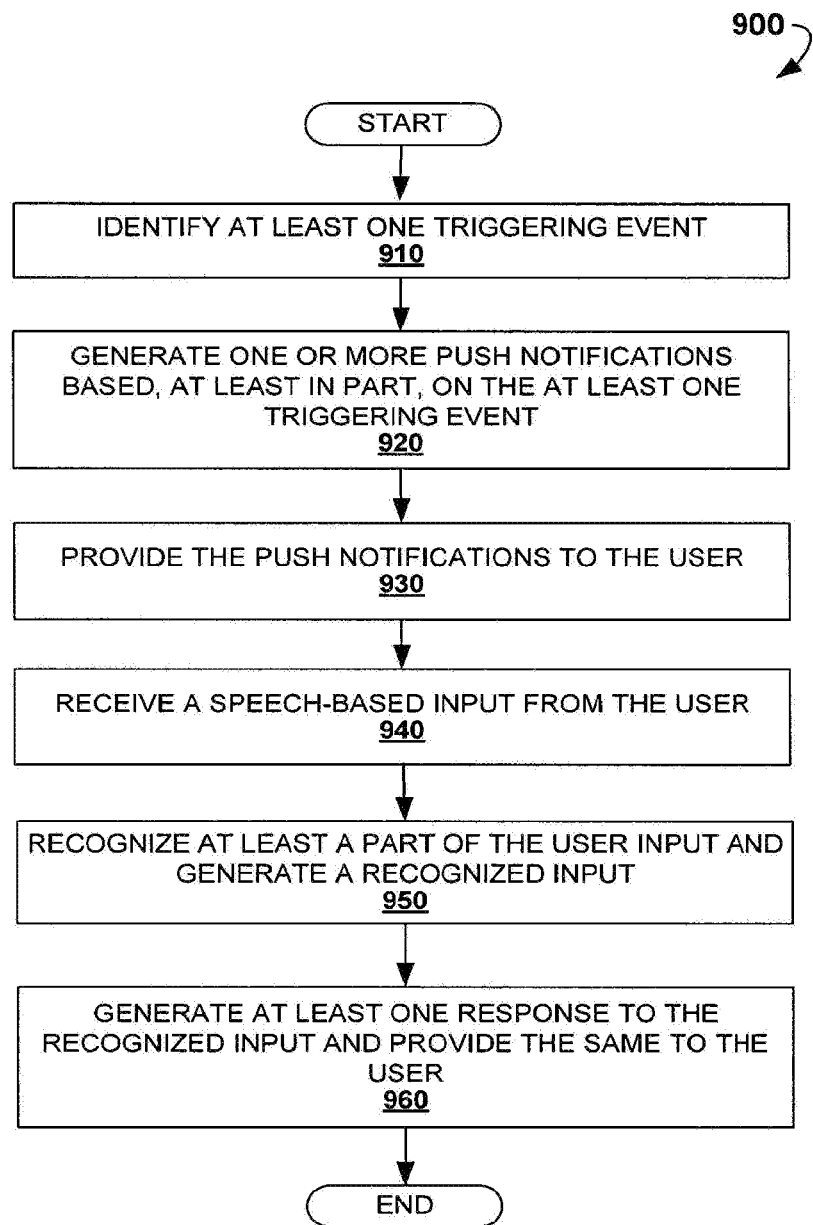
FIG. 9 is a process flow diagram showing a method for proactive delivering push notifications in a CIS according to an example embodiment.

FIG. 9 is a process flow diagram showing a method 900 for proactive delivering push notifications in a CIS, according to an example embodiment. The method 900 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the CIS 306, event manager 308 and/or the push notification manager 312. In other words, the method 900 can be performed by various components discussed above with reference to FIGS. 2-6.

As shown in FIG. 9, the method 900 may commence at operation 910 with the event manager 308 identifying at least one triggering event. For these ends, the event manager 308 may communicate with one or more of the following: the clock 318, the geo location determiner 320, local or remote storage resources 322, and web resources or web services 420. The triggering events may refer to a specific time, presence in a specific location, new message posted on a blogging site, and many other events as described herein.

At operation 920, the push notification manager 312 generates one or more push notifications based, at least in part, on the at least one triggering event. In particular, the push notification manager 312 may refer to one or more databases 310, 314, 316, 324 so as to generate the push notifications following certain rules, criteria or principles. In certain embodiments, some push notifications may include dialog recommendations for the user with suggestions on how user-CIS interaction can be continued.

At operation 930, the push notification manager 312 (and/or the output renderer 250 of the CIS 306 and/or the output module 304) provides the push notifications generated to the user as text messages, image messages, actionable messages, or audio messages.

At operation 940, the CIS 306 may receive a speech-based (audio) input from the user. The user input may be made, for example, via a microphone of the user device 410. At operation 950, the CIS 306 recognizes at least a part of the user input and generates a recognized input. At operation 960, the CIS 306 generates at least one response to the recognized input and provides it to the user as a machine generated audio message and/or displayable text, image, or video message. The output renderer 250 and/or output module 304 may be utilized for these actions.

EXAMPLES

In one example implementation, the user may configure CIS 306 so that "daily brief" push notifications are generated daily at 8.00 a.m. The event manager 308 may monitor current time through the clock 318, and once it is determined that the current time meets certain predetermined settings, the push notification manager 312 generates push notifications following predetermined rules stored in the rule database 314. The push notifications may be presented as audio messages and summarized text messages on a display screen of the user device 410. In an example, the push notifications may include:

- current time and date;
- a list of scheduled events, meetings, and errands for the current day;
- summary of newly received and unread emails (or merely emails having the "important" flag);
- local weather report; and
- summary or titles for selected news feeds or information items.

The user may then select one of delivered push notifications or just provide a voice command, such as "Show my emails" or "Show details of scheduled events," so as to get more information regarding desired items. If the user interrupted the sequence of delivering push notifications, he may resume the delivering of remaining push notifications by providing a voice command such as "Back to brief."

In another example implementation, the user may travel from Washington, D.C. to San Francisco, Calif. Once the user arrives to the airport of San Francisco, the event manager 308 may identify a triggering event associated with a new and predetermined location. Further, based on this triggering event, the push notification manager 312 may generate and provide to the user one or more of the following push notifications:

- current time, date, and location;
- summary of the earliest scheduled event, meeting, or errand to do;
- brief summary of directions or navigational data to the location associated with the earliest scheduled event, meeting, or errand to do;
- local weather report; and
- summary or titles for newly received and unread emails.

In yet another example implementation, the event manager 308 may access a web service 420 associated with a social network (or the event manager 308 may receive a communication from this web service 420) and identify that one of the user's peers in the social network has a birthday in the given day. The push notification manager 312 may provide push notifications (reminders) to the user. Optionally, the push notification manager 312 may provide dialog recommendations for the user suggesting possible user-CIS interaction with respect to the identified triggering event. For example, the dialog recommendations may include suggestions to call the peer, write an instant message or email, schedule a visit, and so forth.

In yet another example implementation, the event manager 308 may identify the presence of the user by monitoring whether or not the user device 410 is within a predetermined wireless network. Once, the event manager 308 identifies that the user arrives at work (e.g., when a work related wireless network is identified), the push notification manager 312 may provide a list of errands or scheduled meetings for the given day. Alternatively, once it is identified that the user arrives at home, the push notification manager 312 may provide a Television (TV) guide, or a recommendations for cooking specific dishes or other information relevant to the user.

In yet other example embodiment, push notifications may be generated in response to a user voice command such as "Show me Daily Brief" or simply "Daily Brief." Alternatively, push notifications may be proactively generated once the user activates a CIS application on the user device 410.

Example of Computing Environment

Figure 10:
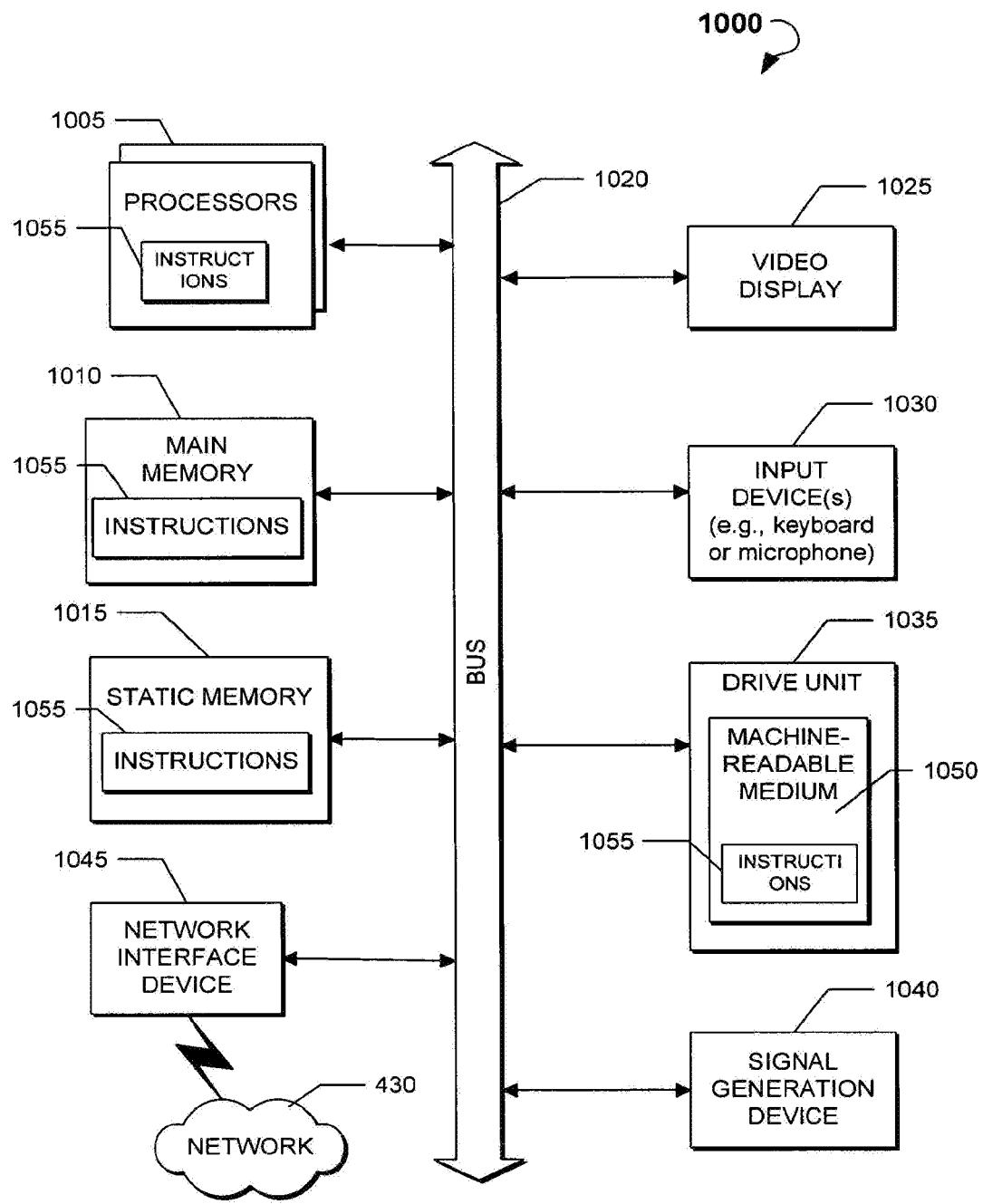
FIG. 10 shows a diagrammatic representation of a computing device for a machine in the example electronic form of a computer system, within which a set of instructions for causing the machine to perform any one or more of the methodologies discussed herein can be executed.

FIG. 10 shows a diagrammatic representation of a computing device for a machine in the example electronic form of a computer system 1000, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), gaming pad, portable gaming console, in-vehicle computer, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1005 (e.g., a central processing unit (CPU), a graphics processing unit (GPU), or both), and a main memory 1010 and a static memory 1015, which communicate with each other via a bus 1020. The computer system 1000 can further include a video display unit 1025 (e.g., a liquid crystal display (LCD) or a cathode ray tube (CRT)). The computer system 1000 also includes at least one input device 1030, such as an alphanumeric input device (e.g., a keyboard), a cursor control device (e.g., a mouse), a microphone, a digital camera, a video camera, and so forth. The computer system 1000 also includes a disk drive unit 1035, a signal generation device 1040 (e.g., a speaker), and a network interface device 1045.

The disk drive unit 1035 includes a computer-readable medium 1050, which stores one or more sets of instructions and data structures (e.g., instructions 1055) embodying or utilized by any one or more of the methodologies or functions described herein. The instructions 1055 can also reside, completely or at least partially, within the main memory 1010 and/or within the processors 1005 during execution thereof by the computer system 1000. The main memory 1010 and the processors 1005 also constitute machine-readable media.

The instructions 1055 can further be transmitted or received over the network 430 via the network interface device 1045 utilizing any one of a number of well-known transfer protocols (e.g., Hyper Text Transfer Protocol (HTTP), CAN, Serial, and Modbus).

While the computer-readable medium 1050 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

CONCLUSION

Thus, methods and systems for proactively delivering push notifications in CIS are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The invention claimed is:

1. A method for proactively delivering push notifications in a chat information system (CIS), the method implemented by one or more processors and comprising:
    receiving a speech-based input provided by a user at a user device during a dialog between the user and the CIS;
    generating, using a speech recognition module, a recognized input for the speech-based input from the user;
    generating, based on the recognized input, a CIS response that is responsive to the recognized input;
    causing the CIS response to be displayed at a touchscreen of the user device;
    generating a dialog recommendation that includes a suggestion on how the dialog between the user and the CIS can be continued, wherein the dialog recommendation is generated based on the recognized input; and
    causing the dialog recommendation to be displayed in an actionable button at the touchscreen of the user device, wherein the actionable button is displayed separate from, but along with, the CIS response;
    wherein the actionable button is selectable and, when selected, causes a further CIS response to be displayed, the further CIS response being responsive to the dialog recommendation.

2. The method of claim 1, wherein the dialog recommendation, if provided in further speech-based input provided by the user, would result in the further CIS response being generated and displayed.

3. The method of claim 1, further comprising, while the dialog recommendation is displayed in the actionable button along with the CIS response:
    receiving a further speech-based input provided by the user at the user device;
    generating, using the speech recognition module, a further recognized input;
    generating, based on the further recognized input, the further CIS response; and
    causing the further CIS response to be displayed at the touchscreen of the user device.

4. The method of claim 1, further comprising while the dialog recommendation is displayed in the actionable button along with the CIS response:
    receiving a user selection of the actionable button, the user selection being via interaction with the touchscreen; and
    causing the further CIS response to be displayed in response to receiving the user selection.

5. The method of claim 4, further comprising causing the further CIS response to be generated in response to receiving the user selection.

6. A method for proactively delivering push notifications in a chat information system (CIS), the method implemented by one or more processors and comprising:
    determining occurrence of at least one triggering event, wherein determining the occurrence of the at least one triggering event includes:
        determining presence of a user device at a geographic location that is determined to be a new location to a user of the user device; and
    responsive to determining the occurrence of the at least one triggering event:
        providing, to the user device one or more push notifications that comprise:
            a weather report that is local to the geographic location, and
            a summary of directions or navigational data for the geographic location;
            wherein providing the one or more push notifications causes the one or more push notifications to be presented at the user device.

7. The method of claim 6, wherein the geographic location is a city.

8. The method of claim 6, further comprising:
    generating a dialog recommendation;
    causing the dialog recommendation to be displayed in an actionable button at a touchscreen of the user device, wherein the actionable button is displayed separate from, but along with, the weather report and the summary of directions or navigational data;
    wherein the actionable button is selectable and, when selected, causes a CIS response, that is responsive to the dialog recommendation, to be displayed.

9. The method of claim 8, wherein the dialog recommendation, if provided in further speech-based input provided by the user, would result in the CIS response being generated and displayed.

10. The method of claim 9, further comprising while the dialog recommendation is displayed in the actionable button along with the CIS response:
- receiving a user selection of the actionable button, the user selection being via interaction with the touchscreen; and
- causing the further CIS response to be displayed in response to receiving the user selection.

11. The method of claim 10, further comprising causing the further CIS response to be generated in response to receiving the user selection.

12. A chat information system (CIS), the CIS comprising:
one or more processors; and
memory storing instructions, that when executed by one or more of the processors, cause one or more of the processors to:
- receive a speech-based input provided by a user at a user device during a dialog between the user and the CIS;
- generate, using a speech recognition module, a recognized input;
- generate, based on the recognized input, a CIS response that is responsive to the recognized input;
- cause the CIS response to be displayed at a touchscreen of the user device;
  - generate a dialog recommendation that includes a suggestion on how the dialog between the user and the CIS can be continued; and
  - cause the dialog recommendation to be displayed in an actionable button at the touchscreen of the user device, wherein the actionable button is displayed separate from, but along with, the CIS response;
- wherein the actionable button is selectable and, when selected, causes a further CIS response to be displayed, the further CIS response being responsive to the dialog recommendation.

13. The CIS of claim 12, wherein the dialog recommendation, if provided in further speech-based input provided by the user, would result in the further CIS response being generated and displayed.

14. The CIS of claim 12, wherein the instructions, when executed by one or more of the processors, further cause one or more of the processors to:
while the dialog recommendation is displayed in the actionable button along with the CIS response:
- receive a further speech-based input provided by the user at the user device;
- generate, using the speech recognition module, a further recognized input;
- generate, based on the further recognized input, the further CIS response; and
- cause the further CIS response to be displayed at the touchscreen of the user device.

15. The CIS of claim 12, wherein the instructions, when executed by one or more of the processors, further cause one or more of the processors to:
while the dialog recommendation is displayed in the actionable button along with the CIS response:
- receive a user selection of the actionable button, the user selection being via interaction with the touchscreen; and
- cause the further CIS response to be displayed in response to receiving the user selection.

16. The CIS of claim 15, further comprising causing the further CIS response to be generated in response to receiving the user selection.

17. The CIS of claim 15, wherein the dialog recommendation, if provided in further speech-based input provided by the user, would result in the further CIS response being generated and displayed.

* * * * *